United States Patent [19]

Del Rosario

[11] Patent Number: 5,084,164
[45] Date of Patent: Jan. 28, 1992

[54] FILTER ASSEMBLY FOR AN AQUARIUM

[76] Inventor: Luis Del Rosario, 5524 San Fernando Rd., Glendale, Calif. 91203

[21] Appl. No.: 532,071

[22] Filed: May 31, 1990

[51] Int. Cl.$^5$ .............................................. A01K 63/04
[52] U.S. Cl. ...................................... 210/94; 210/151; 210/169; 210/416.2; 119/5
[58] Field of Search ............... 210/85, 169, 150, 151, 210/416.2, 94, 95; 119/5

[56] References Cited

U.S. PATENT DOCUMENTS

| | | | |
|---|---|---|---|
| 3,965,007 | 6/1976 | Conn et al. | 210/169 |
| 4,039,448 | 8/1977 | Etani | 210/169 |
| 4,606,821 | 8/1986 | D'Imperio | 210/169 |
| 4,687,575 | 8/1987 | Grose | 210/169 |
| 4,851,112 | 7/1989 | Schlensleer | 210/169 |
| 4,861,465 | 8/1989 | Augustyniak | 210/169 |
| 4,915,828 | 4/1990 | Meyers et al. | 210/169 |
| 4,988,436 | 1/1991 | Cole | 210/169 |
| 5,006,230 | 4/1991 | Votava, III et al. | 210/169 |

*Primary Examiner*—Ivars Cintins
*Assistant Examiner*—Robert James Popovics
*Attorney, Agent, or Firm*—Wagner & Middlebrook

[57] ABSTRACT

A filter assembly and housing for use with an aquarium includes a housing formed of two molded halves of high impact thermoplastic resin each having a flange and wherein the flanges are fastened together to provide a complete housing and including a lid structure for the housing. The housing halves include a number of pairs of horizontal inwardly extending shelves on each half which provide supports for internal components including a DLS filter element and a plastic grid support therefor, a plate supporting an elbow member receiving contaminated water from the aquarium and an adjustable diffuser attached to the elbow for distributing the water over the filter element, a second plastic grid support below the filter element and additional filtering and/or buffering material supported thereon, a window and a channel molded into the front half of the housing and a float operated low water indicator movable in the channel to indicate a low water condition by appearing in the window, a protein skimmer in the housing connected to receive contaminated water, and connections to an external pump to pump cleaned water back to the aquarium.

14 Claims, 2 Drawing Sheets

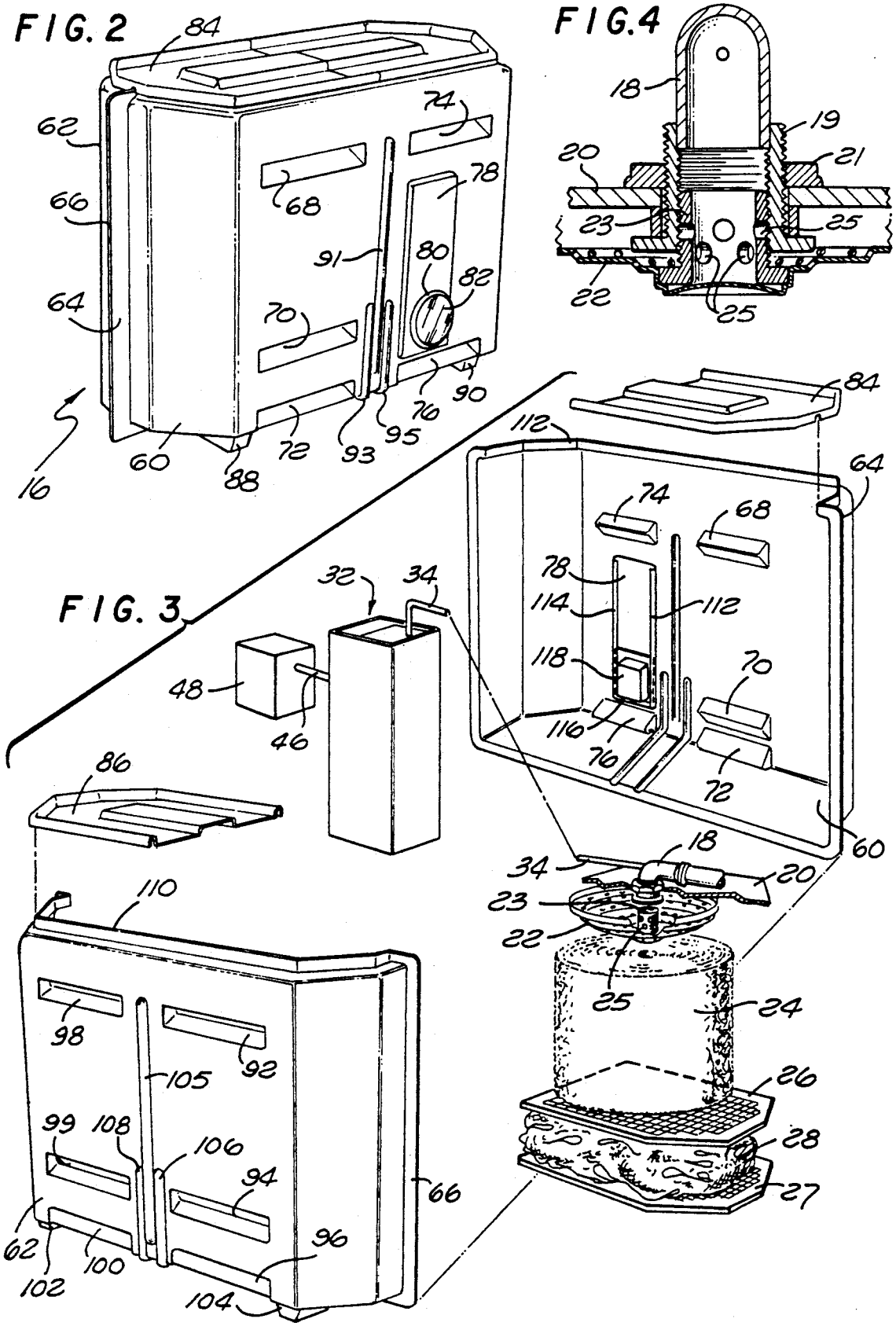

FILTER ASSEMBLY FOR AN AQUARIUM

The present invention relates to an aquarium filter system and housing therefor.

BACKGROUND OF THE INVENTION

It is well known and understood by those who work with aquariums of any significant size that a filtering process of some kind is required to keep the water in habitable condition for the fish. On smaller fresh water aquariums such filtering may involve little more than a simple filter element associated with the water circulation and aeration system, frequently augmented with one or more scavenger type fish. On larger salt water systems and where delicate varieties of fish are involved, a more complex system has been developed, referred to as a wet/dry system in which water is skimmed from the top of the tank, subjected to a pre-filtering operation in which certain solids are removed, and is then diffused through a type of filtering element which operates in air with the contaminated water diffused through it in small droplets known in the art as a DLS (Double Layer Spiral) filter. The function of this DLS filtering element is to support the colonization of nitrifying bacteria which function to consume organic wastes dissolved in the water passing through the filter. This filter is used in combination with a protein skimmer which continually segregates a portion of the water from the pre-filter and removes certain dissolved organic material before it can enter the denitrification cycle (through the DLS filter). The use and function of protein skimmers is well known and understood the art.

To provide the kind of filtration described above, a housing of fairly large size is required. Such housings have, in the past, been assembled much the same as the tanks themselves with several separate members such as pieces of glass or plexiglass sealed together at the edges and the filter members inside and certain pipes and/or hoses connected to the housing. Such filter assemblies are large and heavy and are essentially a custom installation, hence, expensive. It has become apparent that there is a need for a filter assembly which incorporates the above described filtering system, but which is designed and packaged such that it can be conveniently marketed and shipped, and which can be easily installed by an aquarium owner.

SUMMARY OF THE INVENTION

The filter system of this invention utilizes a housing formed of high impact thermoplastic material, preferably formed in two halves with each half incorporating an exterior flange, which flanges are cemented or otherwise secured together to make a housing with a single seam. Molded into the sides are a number of inwardly opposing projections or shelves which support a number of components inside the housing. The housing halves are almost mirror images of each other except for an elongated wide shallow slot in one half which carries a transparent plastic window which replaces one of the inwardly projecting shelves. Captured in a channel behind the window and slot is a low water warning indicator of contrasting color which is attached to a float and moves up and down the channel with changes in the water level in the housing, becoming visible in the window when the water level is low. A partition captured in a pair of opposing grooves divides the interior of the housing into two connected chambers one of which contains the low water warning indicator and the protein skimmer. The other chamber includes two perforated support members supported on opposing pairs of the above described shelves near the bottom of the housing. These members are a plastic egg crate-like structure or grid having significant thickness for strength. The upper support member carries the coiled cylindrical DLS filter. Above the DLS filter is another pair of opposing shelves carrying a flat plate to which is attached a water diffuser. The water diffuser is attached by means of a suitable fitting to a hose or conduit from the pre-filter and diffuses the water from the pre-filter over the DLS filter element. An adjustment is provided to vary the spacing between the diffuser and the plate and also the flow over the DLS filter element.

The protein skimmer is connected to receive some of the water from the pre-filter which is directed to a chamber containing an air stone. An air pump exterior to the housing supplies air to the interior of the air stone which breaks the air into many very small bubbles which float toward the top of the housing carrying dissolved organics as foam which spills over into a foam fractionation chamber. Organic wastes are connected from this chamber to an outside container for easy disposal.

BRIEF DESCRIPTION OF THE DRAWINGS

FIG. 2 is a perspective view of the exterior of the housing of my filter assembly; and FIG. 3 is an exploded view of the filter assembly shown in FIGS. 1 and 2 as seen from the rear.

FIG. 4 is a blow up portion of FIG. 3 showing the water diffuser in detail.

DETAILED DESCRIPTION OF THE PREFERRED EMBODIMENT

Figure 1:
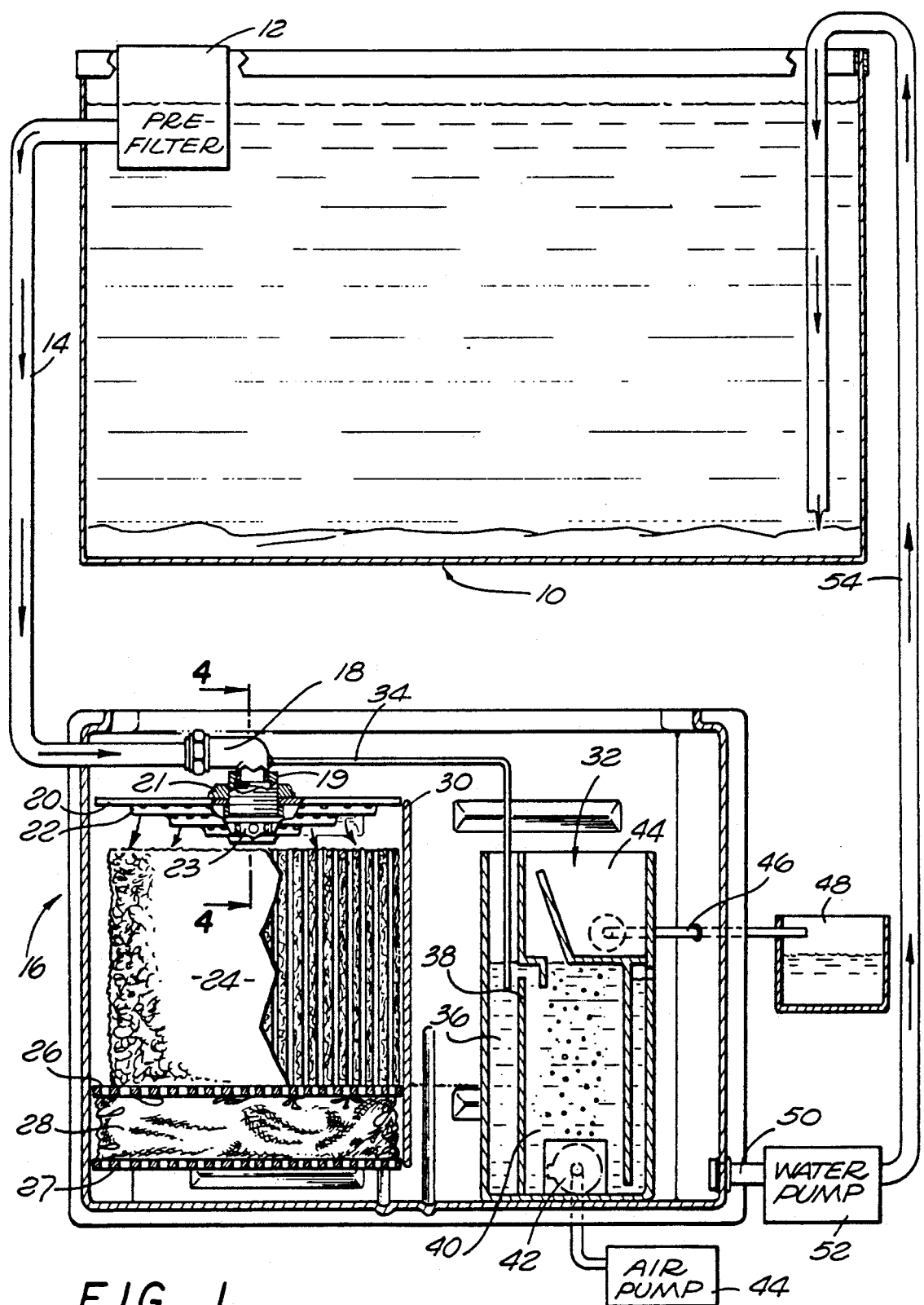
FIG. 1 is a schematic view of an aquarium system including details of my filter assembly.

Referring now to FIG. 1, an aquarium tank is shown at numeral 10 including a pre-filter 12 which removes water from the surface of the tank and provides a filtration of solid waste matter. From there the water from the tank is conveyed through a hose or other suitable conduit 14 to the filter housing 16 where hose 14 is connected to a fitting or elbow 18 which is fastened to a supporting plate 20 by means of a collar 19 fastened to elbow 18 and a nut 21. Threadedly engaged with elbow or fitting 18 is a circular plate 22 which contains a number of holes distributed over its surface, an upstanding lip and an upstanding center post 23, which is threadedly engaged with collar 19, the center post including a number of radial ports whose effective area may be varied by turning plate 22 closer to or farther away from plate 20. Located immediately below the diffuser plate 22 is the DLS filter member 24 which consists of spirally wound alternate layers of a synthetic felt or polyfoam and a wiry heavy-duty plastic mesh which separates the felt layers and which thereby provides a very large effective surface area for the colonization of nitrifying bacteria. Filter element 24 is supported on a support member 26 which is in the form of a plastic egg crate-like structure which permits the flow of water therethrough. Positioned below support member 26 is an additional support member 27 which is essentially identical to number 26 upon which is carried a supply of buffering material such as dolomite or crushed coral encased in a screen bag 28. The housing 16 is divided into two compartments by means of a partition 30 positioned in grooves in the sides of the molded housings. Partition 30 extends neither to the top nor to the bottom of housing 16 and thereby permits flow thereacross at the bottom. Normally water will not flow over the top of partition 30.

Carried in the right hand chamber as described above is a protein skimmer 32 which receives a portion of the water to be processed from the inlet pipe 14 or elbow 18 through a flexible hose or pipe 34. Water from pipe 34 rises in a chamber 36 in the protein skimmer 32 to the height of a partition 38 where it spills over into a chamber 40 containing an air stone 42 connected with a source of air from an air pump 44. Air stone 42 divides the flow of air from the air pump into many finely divided bubbles which serve to collect the organic waste matter in a foam which rises to the top of the protein skimmer 32 and spills over into a foam fractionation chamber 44. From thence, the organic wastes are supplied through a pipe or hose 46 to a container 48 exterior of the filter housing for easy disposal. It is believed that the use and operation of the protein skimmer is well known to those skilled in the art and its purpose and function need not be explained further. Purified water from the filter housing 16 is connected through a conduit 50 to a water pump 52 from whence it is returned through a conduit 54 to the tank 10.

FIG. 2 is perspective view of the exterior of the housing of my filtration assembly. Housing 16 consists of two very similar halves each of which is molded as a complete piece of high impact thermoplastic material. The halves consist of a front half 60 and a rear half 62 each of which is molded with an external flange 64,66 respectively, which flanges can be cemented together or otherwise fastened to provide a complete water tight housing with a single seam. Molded into the front half 60 are a plurality of internally projecting shelves 68,70,72,74 and 76. Similar and directly opposing shelves are molded into the rear half 62 of the housing. It is the function of these shelves to provide support means for various elements within the interior of the housing; shelf 68 and its counterpart on the opposite side supporting plate 20; shelf 70 and its opposite member supporting the porous support member 26; and shelf 72 and its opposing shelf supporting the porous support member 27. It will be appreciated that these shelf members also provide stiffness to the side of the housing. Also molded into the front housing member 60 is an elongated shallow projection 78 which includes at its bottom a circular projection 80 into which is placed a window 82 of transparent plastic. Visible in this window is a low water warning indicator discussed below. A pair of identical half lid members 84 and 86 which are material as the housing halves, are supported on upstanding lip edges formed in the housing halves and enclose the top of the housing thereby minimizing any noise generated in the housing. Each of the housing halves 60 and 62 has also molded thereon a pair of feet, those numbered 88 and 90 being part of front housing half 60 with similar feet being formed in housing half 62. Centered on front half member 60 is a vertical exterior projection 91 which captures and retains the partition member 30. A pair of parallel narrow grooves 93, 95 extend approximately ⅓ up the way of the face of member 60 and curve around and extend to the flange on the bottom of the housing as well. These members in combination with groove 91 provide considerable stiffness to the housing 60.

FIG. 3 is an exploded view of the filter assembly shown in FIGS. 1 and 2 as seen from the rear. In this view, one sees the exterior of the rear housing member 62 which includes a plurality of the inwardly projecting shelves 92, 94, 96, 98, 99 and 100 and also a pair of feet 102 and 104 described above. Also visible is the flange 66 which runs down both sides and across the bottom of member 62 which mates with the flange 64 of housing member 60. The molded slot 105 cooperates with slot 91 to secure the partition 30. Additional molded grooves 106, 108 are incorporated in approximately the lower third of the housing and extend across the bottom to flange 66 to provide additional stiffness of the housing. Each of housing member 60 and 62 includes at its top an upstanding lip 110 and 112, respectively, which fit in peripheral grooves formed in lid members 84 and 86. In this view one sees the inside of housing member 60 including support shelves 68, 70 and 72 which, as indicated above, support plate 20 and the porous support members 26 and 27. The diffuser plate 22 is moved away from the elbow 18 which is fastened to plate 20 in order to show the upstanding center post 23 which carries a plurality of radial ports 25 and is threadedly engaged with internal threads on collar 19 attached to the elbow member 18. Rotation of plate 22 into or out of collar 19 varies the effective area of ports 25 and, hence, the flow of water into the diffuser. In this view the slot projection 78 is shown with a pair of plastic strips 112, 114 overlying it in such manner as to capture an indicator member 116 which is of contrasting color such that it may be seen through window 82 (FIG. 2). Member 116 is movable vertically in the channel between projection 78 and members 114, 112. Attached to indicator member 116 which, in the position shown, would be visible behind the window 82 is a float member 118 which follows the level of the water in the housing and which will, in the normal course of operation, be lifted to a position such that the indicator 116 is not visible in the window 82 thereby showing that the supply of water in the filter system is adequate. Should the water level become low, the float will drop carrying the indicator 116 to a position where it is visible in window 82 thus alerting anyone monitoring the system to the low water condition.

The protein skimmer 32 is shown displaced to the left from its normal position in the housing as seen in this view and the flexible pipe or hose 34 which brings the water from the inlet conduit or elbow 18 is shown connected to the skimmer 32 by means of a dotted line connection. Conduit 46 for carrying the waste from the skimmer and conveying it to the external container 48 is also shown. The housing of the protein skimmer 32 is preferably formed as mating halves of high impact thermoplastic resin, each half including an exterior flange with the flanges sealed together. Interior walls are bonded to the insides of the housing halves.

From the foregoing, it will be recognized that Applicant herein has provided a filter assembly incorporating a wet/dry DLS filter element representing considerable advantages in convenience, cost, safety and efficiency. Through the use of the two mating molded halves, a filter housing of very light weight is provided which is convenient for shipping and handling and which is yet very strong and provides means for locating and supporting the necessary internal members. The housing could be formed of a single structure, eliminating the seam. A lid structure is supplied for reducing the amount of noise from the filter system. The system incorporates both the protein skimmer and the low water warning indicator. Through the use of the described adjustable diffuser, the amount of flow downwardly over and through the filter media is controllable. Connections to the tank and to the external air and water pumps are easily effected. The system can accommodate a wide range of flows of water as supplied by the pump and modified by various loading means including length of plumbing and types of filters and pre-filters etc. Obviously, the flow can be maximized by using the shortest length and largest size of plumbing and by keeping the height differential between the filter assembly and the tank to a minimum.

What is claimed is;

1. A filter assembly for use with a wet/dry filter system for an aquarium including a fish tank, a pump for pumping water to the tank, a pre-filter for collecting and filtering water from the tank and an inlet conduit carrying water containing waste products to said filter assembly;

wherein said filter assembly comprises:
a generally rectangular housing of molded thermoplastic material;
a partition in said housing dividing the interior into first and second chambers but permitting communication between said chambers above and below said partition, a plurality of pairs of molded horizontal inwardly extending shelves formed in the sides of said housing in at least one of said chambers including at least a fair pair located near the top of said housing, a second pair located near the bottom of said housing, and a perforate support member carried on said pair of said shelves;
a filter element carried on said perforate support member;
a water diffuser including a plate on said first pair of shelves above said filter element, a water conduit connected to said first names element conduit including an elbow and means connecting said elbow to said plate, said connecting means including a threaded member, and a perforated diffuser plate positioned adjacent the lower surface on said plate, said diffuser plate including an upstanding lip and an upstanding center post having radial ports and being threadedly engaged with said threaded member, said water diffuser being adjustable by varying its threaded engagement with said internally threaded member to thereby vary the effective area of said radial ports; and
a protein skimmer positioned in the other of said chambers including a first compartment for receiving an air stone and a foam fractionation chamber for collecting organic wastes.

2. A filter assembly as claimed in claim 1 wherein said housing includes two halves of high impact molded thermoplastic material, each half including a side, left, right and bottom portions, and a continuous flange adjacent said left, right and bottom portions, and means sealing said flanges together.

3. A filter assembly as claimed in claim 2 wherein one of said molded halves of said housing includes a shallow outwardly extending projection of substantial width and height extending from near the bottom of said housing somewhat greater than half the height of said housing, an opening in said housing located near the bottom of said projection and a transparent member closing said opening, means cooperating with the inside of said projection to define a pair of channels at the edges of said projection, a marker of contrasting color movable in said channels and a float fastened to said marker to move said marker in said channels with changes in the height of the water in said housing whereby said marker will become visible behind said transparent member when the water level in said housing is low.

4. A filter assembly as claimed in claim 2 wherein said filter element includes alternate layers of polyfoam and heavy plastic mesh which are spirally wound to provide a cylindrical element.

5. A filter assembly as claimed in claim 2 wherein said first compartment of said protein skimmer adapted to contain an air stone includes a port and a snap cover removably covering said port.

6. A filter assembly as claimed in claim 5 wherein said protein skimmer is formed of two halves of molded thermoplastic material having flanges, internal walls separating said compartments are bonded to said halves and said halves are bonded together at said flanges.

7. A filter assembly as claimed in claim 2 wherein said housing includes lid means.

8. A filter assembly as claimed in claim 2 wherein each half of said housing includes an outwardly projecting vertical groove molded in said thermoplastic material and said partition is retained in said grooves.

9. A filter assembly as claimed in claim 2 including a source of air connected to said first compartment, a first flexible water pipe connected to said inlet conduit communicating with said first compartment, and a second flexible water pipe for discharging said organic wastes into a chamber exterior of said filter assembly.

10. A filter assembly for use with a wet/dry filter system for an aquarium tank including first conduit means for supplying water containing waste products from said tank to said filter assembly and second conduit means including a pump connecting said filter assembly to said tank;

wherein said filter assembly comprises:
a generally rectangular housing including two halves of molded thermoplastic material, each half including a side, left and right end and bottom portions, and a continuous flange adjacent said portions and means sealing said flanges together;
a partition in said housing dividing the interior into first and second chambers but permitting communication between said chambers above and below said partition, a plurality of pairs of molded horizontal inwardly extending shelves formed in the sides of said housing in at least one of said chambers including at least a first pair located near the top of said housing, a second pair located near the bottom of said housing, and a perforate support member carried on said second pair of said shelves;
a DLS filter element carried on said perforate support member;
a water diffuser including a plate supported on said first pair of shelves above said DLS filter element, a water conduit connected to said first conduit means including means connected to said plate, said connecting means including a threaded member, and a perforated diffuser plate positioned adjacent the lower surface of said plate, said diffuser plate including an upstanding lip and an upstanding center post having radial ports and being threadedly engaged with said threaded member;
a protein skimmer positioned in the other of said chambers; and a low water warning indicator including a window in the side of said housing and a float operated device for indicating a low water condition in said window.

11. A filter assembly as claimed in claim 10 wherein said protein skimmer includes a first compartment and a first flexible pipe connecting said first compartment with said first conduit means, a second compartment and a second flexible pipe connecting said second compartment with a reservoir of organic waste exterior of said filter assembly, and means connecting said first compartment with a source of air.

12. A filter assembly as claimed in claim 10 wherein said filter element includes alternate layers of polyfoam and heavy plastic mesh which are spirally wound to provide a cylindrical element.

13. A filter assembly as claimed in claim 10 wherein said water diffuser is adjustable by varying its threaded engagement with said internally threaded member to thereby vary the effective area of said radial ports.

14. A filter assembly as claimed in claim 13 wherein said housing includes lid means.

* * * * *

UNITED STATES PATENT AND TRADEMARK OFFICE
CERTIFICATE OF CORRECTION

PATENT NO. : 5,084,164
DATED : 01/28/92
INVENTOR(S) : Luis Del Rosario

It is certified that error appears in the above-identified patent and that said Letters Patent is hereby corrected as shown below:

Column 3, line 1, delete "10".

Column 3, line 54, before "material" insert --molded of the same--.

Column 5, line 30, replace "fair" with --first--.

Column 5, line 33, after "said" first occurence, insert --first--.

Column 5, line 33, after "said" first occurrence, insert --second--.

Signed and Sealed this

Sixth Day of July, 1993

Attest:

MICHAEL K. KIRK

Attesting Officer

Acting Commissioner of Patents and Trademarks